(12) United States Patent
Takaku et al.

(10) Patent No.: US 10,385,227 B2
(45) Date of Patent: Aug. 20, 2019

(54) INKJET RECORDING METHOD USING COLORED INK

(71) Applicant: Konica Minolta, Inc., Chiyoda-ku, Tokyo (JP)

(72) Inventors: Yusuke Takaku, Tokyo (JP); Masashi Ikeda, Tokyo (JP); Yuka Yazaki, Tokyo (JP); Hiromichi Nishiyama, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/746,692

(22) PCT Filed: Jun. 29, 2016

(86) PCT No.: PCT/JP2016/069206
§ 371 (c)(1),
(2) Date: Jan. 22, 2018

(87) PCT Pub. No.: WO2017/014014
PCT Pub. Date: Jan. 26, 2017

(65) Prior Publication Data
US 2018/0208789 A1 Jul. 26, 2018

(30) Foreign Application Priority Data
Jul. 21, 2015 (JP) .................................. 2015-143928

(51) Int. Cl.
| | |
|---|---|
| C08F 2/46 | (2006.01) |
| C08F 2/50 | (2006.01) |
| C08G 61/04 | (2006.01) |
| C09D 11/40 | (2014.01) |
| B41J 2/21 | (2006.01) |
| C09D 11/38 | (2014.01) |
| B41M 5/00 | (2006.01) |
| B41M 7/00 | (2006.01) |
| C09D 11/037 | (2014.01) |
| C09D 11/101 | (2014.01) |
| C09D 11/107 | (2014.01) |
| C09D 11/322 | (2014.01) |
| B41J 2/515 | (2006.01) |

(52) U.S. Cl.
CPC ................ *C09D 11/40* (2013.01); *B41J 2/21* (2013.01); *B41J 2/515* (2013.01); *B41M 5/0023* (2013.01); *B41M 7/0081* (2013.01); *C09D 11/037* (2013.01); *C09D 11/101* (2013.01); *C09D 11/107* (2013.01); *C09D 11/322* (2013.01); *C09D 11/38* (2013.01)

(58) Field of Classification Search
CPC ....... C09D 11/40; C09D 11/38; C09D 11/107; C09D 11/322; C09D 11/101; C09D 11/037; B41M 7/0081; B41M 5/0023; B41J 2/21
USPC ............................................ 522/71, 1; 520/1
See application file for complete search history.

(56) References Cited

U.S. PATENT DOCUMENTS

2008/0204538 A1    8/2008  Kovacs et al.

FOREIGN PATENT DOCUMENTS

| JP | 2012121288 A | 6/2012 | |
|---|---|---|---|
| JP | 2015040281 A | 3/2015 | |
| WO | WO-2013157271 A1 * | 10/2013 | ............ B41J 2/2114 |

OTHER PUBLICATIONS

Maeda et al, WO 2013/157271 Machine Translation, Oct. 24, 2013 (Year: 2013).*
International Search Report corresponding to Application No. PCT/JP2016/069206; dated Aug. 23, 2016.

* cited by examiner

*Primary Examiner* — Jessica Whiteley
(74) *Attorney, Agent, or Firm* — Cantor Colburn LLP

(57) ABSTRACT

Purpose is to provide an inkjet recording method for forming high-quality color image on a thick recording medium having low thermal conductance rate. The present invention is a single-pass inkjet recording method using an ink set including at least two active ray-curing color inks, and a recording medium having thermal conductivity of less than 0.10 W/(m·K) and thickness of 0.4 mm or more. The ink set containing two color inks satisfy only condition (a), and the ink set containing three or more color inks satisfy conditions (a) and (b): (a) most downstream color ink has a gelation temperature which is 3.0° C. to 15.0° C. higher than that of most upstream color ink, and (b) second or subsequent color ink from the most upstream position in conveyance direction has a gelation temperature which is the same as or higher than that of an adjacent color ink at the upstream position.

7 Claims, 3 Drawing Sheets

INKJET RECORDING METHOD USING COLORED INK

CROSS REFERENCE TO RELATED APPLICATIONS

The present U.S. patent application is a U.S. National Phase Application under 35 USC 371 of International Application PCT/JP2016/069206, filed on Jun. 29, 2016. Priority under 35 U.S.C § 119(a) and 35 U.S.C. § 365(b) is claimed from Japanese Application No. 2015-143928 filed on Jul. 21, 2015, the entirety of which is incorporated herein by references

TECHNICAL FIELD

The present invention relates to an inkjet recording method using color inks.

BACKGROUND ART

An image forming method using an inkjet recording method is a method for forming an image by discharging an ink supplied from an ink tank through a channel from a recording head for discharge. The inkjet recording method can form an image simply and inexpensively and therefore has been used for forming various images. As one of the inks for use in the inkjet recording method, there is an actinic radiation-curable inkjet ink. The actinic radiation-curable inkjet ink comprises a photocurable compound, and therefore an ink component can be cured by polymerizing the photocurable compound through irradiation with actinic radiation such as ultraviolet rays. When an image is formed using the actinic radiation-curable inkjet ink, it is easier to immobilize a discharged ink and an image with little bleeding can be formed on various recording media than when a solvent-based ink composition is used.

For example, a gel ink comprising a gelling agent such as wax is developed in order to improve a pinning property of the actinic radiation-curable inkjet ink. In a recording method using such an ink, an image is formed by melting gel at high temperatures to land an ink droplet on a recording medium, and then allowing the landed ink droplet to undergo gelation (solidify). There have been some cases where ink dots are isolated and an irregularity occurs in an image portion or nonuniform feeling in glossiness is brought about when the landed ink droplet solidifies rapidly. For example, in PTL 1, the farther a recording medium (normal paper or the like) is apart from heating means installed on an upstream side, the lower the temperature of the recording medium is, and therefore the gelation temperature of an ink to be discharged on a downstream side is made to lower according to the temperature of the recording medium, thereby preventing the rapid solidification of the ink on the downstream side and stabilizing the glossiness.

In addition, PTL 2 discloses an ink set in which the gelation temperature of a clear ink is made higher than the gelation temperature of a color ink as an ink set for forming a printed image having a high image quality and a uniform matted feeling. In this literature, the relationship among the gelation temperatures of a plurality of color inks to be used is not described, but, with respect to the gelation temperatures of color inks to be printed in the order of Y, M, C, and K in a color ink set used in Examples, the gelation temperature of K to be printed finally is set to be lower than the gelation temperature of Y to be printed first.

In PTL 1 and PTL 2 described above, the specific description on the formation of an image using thick paper or corrugated paper as a recording medium is not made. With respect to an inkjet recording method intended for use for thick paper, corrugated paper, or the like, for example, PTL 3 discloses a method and an apparatus for forming an image on corrugated paper using an ultraviolet ray-curable gel ink.

CITATION LIST

Patent Literature

PTL 1
Japanese Patent Application Laid-Open No. 2012-121288
PTL 2
Japanese Patent Application Laid-Open No. 2015-40281
PTL 3
US Patent Application Publication No. 2008/0204538

SUMMARY OF INVENTION

Technical Problem

In the literatures described above, a method for forming a high-quality image on corrugated paper or the like, which is likely to store heat, using a plurality of actinic radiation-curable color inks is not described. With respect to paper; thin corrugated cardboard comprising a corrugated medium and a liner; and the like having a low thermal conductivity, when a large amount of heat is transmitted from an ink to the recording medium at the time of landing of a gel ink or when radiant heat from a head is applied to a base material in conveying the recording medium, the heat is stored without being dissipated, which is different in the case of normal paper, to raise the temperature of the base material. As a result, the more downstream side in the conveyance direction the recording medium is on, the higher the temperature of the surface of the recording medium rises. In the gel ink, pinning and leveling are controlled according to the phase transfer temperature (gelation temperature) of the ink, and therefore it becomes difficult to maintain the image quality constant when the temperature of the surface of the recording medium changes.

The present invention has been completed in view of the above-described circumstances, and an object of the present invention is to provide an inkjet image forming method capable of forming a high-quality color image even on a thick recording medium having a low thermal conductivity.

Solution to Problem

In view of the above problems, the present invention relates to the following inkjet recording methods.

[1] An inkjet recording method of single pass recording type, the recording method comprising:
  using an ink set comprising at least two actinic radiation-curable color inks each comprising a photocurable compound, a gelling agent, and a colorant to jet out droplets of a plurality of color inks, thereby landing the inks onto a recording medium; and
  irradiating the color inks landed onto the recording medium with actinic radiation to cure the inks,
  wherein:
  when the ink set contains two different color inks, the ink set satisfies only condition (a), and when the ink set contains three or more different color inks, the ink set satisfies both conditions (a) and (b), the conditions (a) and (b) being:
(a) a color ink at a most downstream position has a gelation temperature which is 3.0° C. to 15.0° C. higher than a gelation temperature of a color ink at a most upstream position, and
(b) a second or subsequent color ink as counted from the most upstream position in a conveyance direction has a gelation temperature which is the same as or higher than a gelation temperature of an adjacent color ink at an upstream side; and
the recording medium has a thermal conductivity of less than 0.10 W/(m·K) and has a thickness of 0.4 mm or more.
[2] The recording method according to [1], wherein the recording medium is a paper having a basis weight of 200 g/m$^2$ or more, or is a thin corrugated cardboard comprising a corrugated medium and a liner.
[3] The recording method according to [1] or [2], wherein in condition (a), the gelation temperature of the second or subsequent color ink is higher than the gelation temperature of the adjacent color ink at the upstream position.
[4] The recording method according to any one of [1] to [3], wherein the ink set comprises 4 color inks of yellow (Y), magenta (M), cyan (C), and black (K), and further comprises a different color ink.
[5] The recording method according to any one of [1] to [4], wherein the color ink at the most downstream position is a color ink having a highest brightness in the ink set.
[6] The recording method according to any one of [1] to [5], wherein each color ink contained in the ink set has a gelation temperature in a range of from 30° C. to 60° C.
[7] The recording method according to any one of [1] to [6], wherein the gelling agent comprises at least one compound selected from the group consisting of a compound represented by the following formula (G1) and a compound represented by the following formula (G2):

R1-CO—R2; and     Formula (G1):

R3-COO—R4,     Formula (G2):

wherein R1 to R4 each independently represents a hydrocarbon group comprising a a straight-chain moiety having 12 or more carbon atoms and optionally comprising an additional branched moiety.

Advantageous Effects of Invention

In the inkjet recording method according to the present invention, the gelation temperatures of the color inks are adjusted taking into consideration the heat storage in the base material which occurs when printing on a thick recording medium having a low thermal conductivity is performed, and therefore lowering of the curability of the inks due to the temperature rise of the recording medium can be suppressed. Accordingly, when the method according to the present invention is used, a high-quality color image without difference in glossiness; color unevenness; or a blank can be formed.

BRIEF DESCRIPTION OF DRAWINGS

FIG. 3A illustrates a side view, and FIG. 3B illustrates a top view.

DESCRIPTION OF EMBODIMENTS

Figure 1:
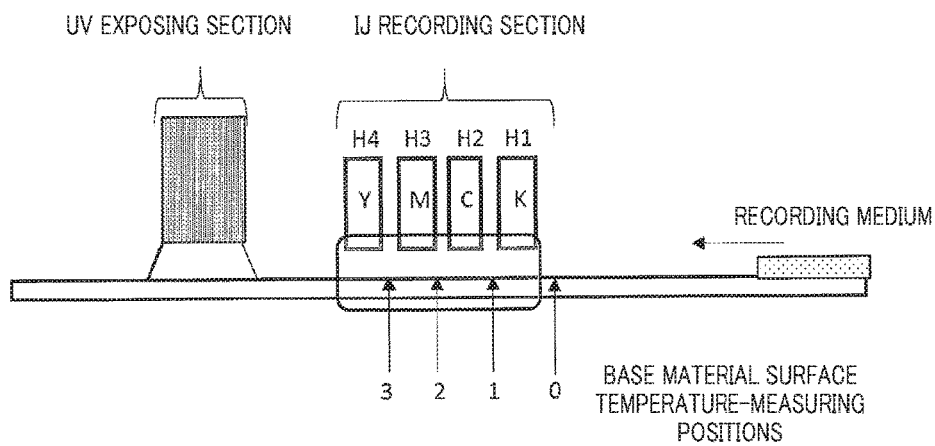
FIG. 1 shows a schematic diagram illustrating positions where a surface temperature of a recording medium is measured when printing with an inkjet recording apparatus of single pass recording type is performed using an ink set of 4 colors and a graph showing changes in the surface temperatures of recording media versus the measuring position.
Figure 1:
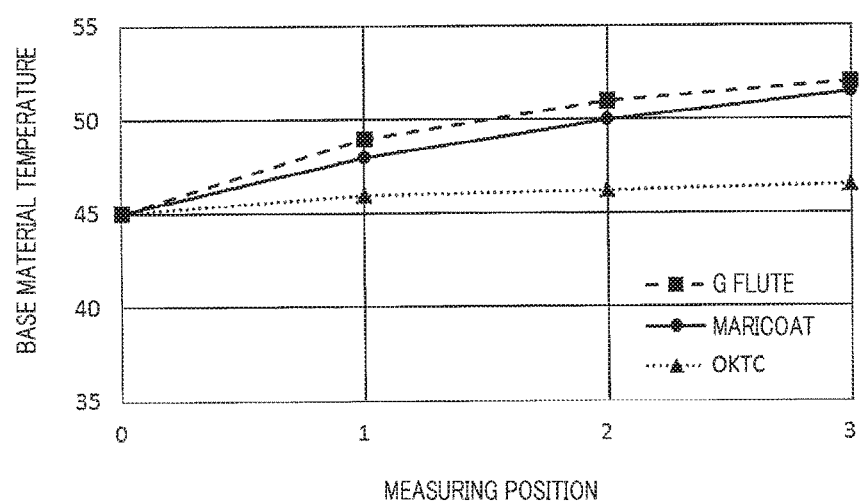

The present invention is an inkjet recording method of single pass recording type, the recording method comprising: a first step of jetting droplets of a plurality of color inks to land on a recording medium using an ink set comprising at least two color inks; and a second step of irradiating the color inks landed on the recording medium with actinic radiation to cure the inks.

<Color Inks>

The color inks for use in the present invention are actinic radiation-curable color inks each comprising a photocurable compound, a gelling agent, and a colorant.

(Photocurable Compound)

The photocurable compound is a compound that is cross-linked or polymerized by actinic radiation. Examples of the actinic radiation include electron beams, ultraviolet rays, α rays, γ rays, and X rays, and ultraviolet rays and electron beams are preferable. The photocurable compound is a radical polymerizable compound or a cationic polymerizable compound and is preferably a radical polymerizable compound.

The radical polymerizable compound is a compound (monomer, oligomer, polymer, or mixtures thereof) which has an ethylenically unsaturated bond, which is radically polymerizable. These radical polymerizable compounds may be used singly or in combination of two or more types thereof.

Examples of the compound which has an ethylenically unsaturated bond, which is radically polymerizable, include an unsaturated carboxylic acid and a salt thereof, an unsaturated carboxylic acid ester compound, an unsaturated carboxylic acid urethane compound, an unsaturated carboxylic acid amide compound and an anhydride thereof, acrylonitrile, styrene, unsaturated polyester, unsaturated polyether, unsaturated polyamide, and unsaturated urethane. Examples of the unsaturated carboxylic acid include (meth)acrylic acid, itaconic acid, crotonic acid, isocrotonic acid, and maleic acid.

Among them, the radical polymerizable compound is preferably an unsaturated carboxylic acid ester compound, and more preferably a (meth)acrylate. The (meth)acrylate is not limited to the monomers described later but may be an oligomer, a mixture of a monomer and an oligomer, a modified product, an oligomer having a polymerizable functional group, or the like.

Examples of the (meth)acrylate include: monofunctional monomers such as isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 2-(meth)acryloyloxyethyl hexahydrophthalate, butoxyethyl (meth)acrylate, ethoxy diethylene glycol (meth)acrylate, methoxy diethylene glycol (meth)acrylate, methoxy polyethylene glycol (meth)acrylate, methoxy propylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxyethyl succinate, 2-(meth)acryloyloxyethyl phthalate, 2-(meth)acryloyloxyethyl-2-hydroxyethyl-phthalate, and t-butylcyclohexyl (meth)acrylate;

bifunctional monomers such as triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A-PO adduct di(meth)acrylate, hydroxy pivalic acid neopentyl glycol di(meth)acrylate, and polytetramethylene glycol di(meth)acrylate; and polyfunctional monomers which are trifunctional or higher-functional monomers such as trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, and pentaerythritol ethoxy tetra(meth)acrylate.

Among the (meth)acrylates, stearyl (meth)acrylate, lauryl (meth)acrylate, isostearyl (meth)acrylate, ethoxy diethylene glycol (meth)acrylate, isobornyl (meth)acrylate, tetraethylene glycol di(meth)acrylate, glycerin propoxy tri(meth)acrylate, and the like are preferable from the viewpoint of photosensitivity and the like.

The (meth)acrylate may be a modified product. Examples of the modified product include: ethylene oxide-modified (meth)acrylates such as ethylene oxide-modified trimethylolpropane tri(meth)acrylate and ethylene oxide-modified pentaerythritol tetraacrylate; caprolactone-modified (meth)acrylates such as caprolactone-modified trimethylolpropane tri(meth)acrylate; and caprolactam-modified (meth)acrylates such as caprolactam-modified dipentaerythritol hexa(meth)acrylate.

Preferred examples of the (meth)acrylate compound include (1) a trifunctional or higher-functional methacrylate or acrylate compound having 3 to 14 structures represented by (—C(CH$_3$)H—CH$_2$—O—) in the molecule and (2) a bifunctional or higher-functional methacrylate or acrylate compound having a cyclic structure in the molecule. These (meth)acrylate compounds have a high photocurability and exhibit little shrinkage when cured. Further, these (meth)acrylate compounds have an excellent dissolution performance for gelling agents because of their relatively high hydrophobicity and therefore exhibit a high repeatability of sol-gel phase transition.

(1) The trifunctional or higher-functional methacrylate or acrylate compound having 3 to 14 structures represented by (—C(CH$_3$)H—CH$_2$—O—) in the molecule refers to, for example, a compound obtained by modifying hydroxy groups of a compound having 3 or more hydroxy groups with propylene oxide and then esterifying the resultant modified product with (meth)acrylic acid. Specific examples of this compound include 3PO-modified trimethylolpropane triacrylate Photomer 4072, and 3PO-modified trimethylolpropane triacrylate Miramer M360.

(2) The bifunctional or higher-functional methacrylate or acrylate compound having a cyclic structure in the molecule refers to, for example, a compound obtained by esterifying hydroxy groups of a compound having 2 or more hydroxy groups and a tricycloalkane with (meth)acrylic acid. Specific examples of this compound include tricyclodecane dimethanol diacrylate NK Ester A-DCP, and tricyclodecane dimethanol dimethacrylate NK Ester DCP.

Other examples of these (meth)acrylate compounds include 1,10-decanediol dimethacrylate NK Ester DOD-N.

A preferred photocurable compound may further comprise a photocurable compound other than the (meth)acrylate compounds.

Examples of the photocurable compound other than the (meth)acrylate compounds include: 4EO-modified hexanediol diacrylate (CD561, manufactured by Sartomer); 3EO-modified trimethylolpropane triacrylate (SR454, manufactured by Sartomer); 4EO-modified pentaerythritol tetraacrylate (SR494, manufactured by Sartomer); 6EO-modified trimethylolpropane triacrylate (SR499, manufactured by Sartomer); caprolactone acrylate (SR495B, manufactured by Sartomer); polyethylene glycol diacrylate (NK Ester A-400, manufactured by Shin-Nakamura Chemical Co., Ltd.) and (NK Ester A-600, manufactured by Shin-Nakamura Chemical Co., Ltd.); polyethylene glycol dimethacrylate (NK Ester 9G, manufactured by Shin-Nakamura Chemical Co., Ltd.) and (NK Ester 14G, manufactured by Shin-Nakamura Chemical Co., Ltd.); tetraethylene glycol diacrylate (V#335HP, manufactured by Osaka Organic Chemical Industry Ltd.); stearyl acrylate (STA, manufactured by Osaka Organic Chemical Industry Ltd.); phenol EO-modified acrylate (M144, manufactured by Miwon Specialty Chemical Co., Ltd.); and nonylphenol EO-modified acrylate (M166, manufactured by Miwon Specialty Chemical Co., Ltd.).

The (meth)acrylate may be a polymerizable oligomer, and examples of the polymerizable oligomer include epoxy (meth)acrylate oligomers, aliphatic urethane (meth)acrylate oligomers, aromatic urethane (meth)acrylate oligomers, polyester (meth)acrylate oligomers, and straight-chain (meth)acrylate oligomers.

The cationic polymerizable compound can be an epoxy compound, a vinyl ether compound, an oxetane compound, or the like. These cationic polymerizable compounds may be used singly or in combination of two or more types thereof.

The epoxy compound refers to an aromatic epoxide, an alicyclic epoxide, an aliphatic epoxide, or the like, and the aromatic epoxide and the alicyclic epoxide are preferable in order to improve curability.

The aromatic epoxide can be a diglycidyl ether or a polyglycidyl ether obtained by reacting a polyhydric phenol or an alkylene oxide adduct thereof with epichlorohydrin. Examples of the polyhydric phenol or the alkylene oxide adduct thereof which is subjected to the reaction include bisphenol A or an alkylene oxide adduct thereof. The alkylene oxide in the alkylene oxide adduct can be ethylene oxide, propylene oxide, or the like.

The alicyclic epoxide can be a cycloalkane oxide-containing compound obtained by epoxidizing a cycloalkane-containing compound with an oxidizing agent such as hydrogen peroxide or a peracid. The cycloalkane in the cycloalkane oxide-containing compound can be cyclohexene or cyclopentene.

The aliphatic epoxide can be a diglycidyl ether or a polyglycidyl ether obtained by reacting an aliphatic polyhydric alcohol or an alkylene oxide adduct thereof with epichlorohydrin. Examples of the aliphatic polyhydric alcohol include alkylene glycols such as ethylene glycol, propylene glycol, and 1,6-hexanediol. The alkylene oxide in the alkylene oxide adduct can be ethylene oxide, propylene oxide, or the like.

Examples of the vinyl ether compound include:

monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether; and divinyl or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether. Among these vinyl ether compounds, divinyl or trivinyl ether compounds are preferable taking curability and adhesion into consideration.

The oxetane compound refers to a compound having an oxetane ring, and examples thereof include oxetane compounds described in Japanese Patent Application Laid-Open Nos. 2001-220526, 2001-310937, and 2005-255821. Examples thereof include a compound represented by Formula (1) described in paragraph [0089] of Japanese Patent Application Laid-Open No. 2005-255821, a compound represented by Formula (2) described in paragraph [0092] thereof, a compound represented by Formula (7) described in paragraph [0107] thereof, a compound represented by Formula (8) described in paragraph [0109] thereof, and a compound represented by Formula (9) described in paragraph [0116] thereof. Formulas (1), (2), and (7) to (9) described in Japanese Patent Application Laid-Open No. 2005-255821 are shown below.

[Formula 1]

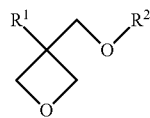

Formula (1)

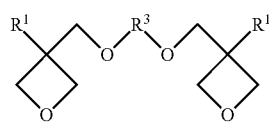

Formula (2)

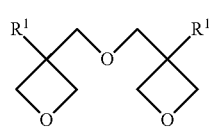

Formula (7)

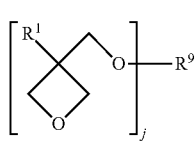

Formula (8)

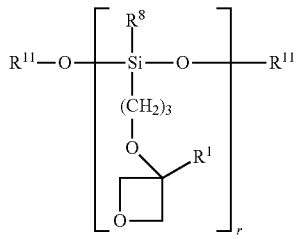

Formula (9)

The content of the photocurable compound in the actinic radiation-curable inkjet ink is preferably from 1 to 97 mass %, and more preferably from 30 to 95 mass %.

(Photopolymerization Initiator)

The actinic radiation-curable inkjet ink may comprise a photopolymerization initiator. The photopolymerization initiator contained in the actinic radiation-curable inkjet ink includes a radical photopolymerization initiator and a cationic photopolymerization initiator, and the radical photopolymerization initiator includes an intramolecular bond cleaving type and an intramolecular hydrogen withdrawing type. Examples of the intramolecular bond cleaving type photopolymerization initiator include: acetophenones such as diethoxy acetophenone, 2-hydroxy-2-methyl-1-phenyl-propan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl) ketone, 1-hydroxycyclohexyl-phenyl ketone, 2-methyl-2-morpholino(4-thiomethylphenyl)propan-1-one, and 2-benzyl-2-dimethylamino-1-(4-morpholinophenyl)-butanone; benzoins such as benzoin, benzoin methyl ether, and benzoin isopropyl ether; acylphosphine oxides such as 2,4,6-trimethylbenzoin diphenylphosphine oxide; benzil, and methylphenyl glyoxyester.

Examples of the intramolecular hydrogen withdrawing type photopolymerization initiator include: benzophenones such as benzophenone, o-benzoyl benzoic acid methyl-4-phenylbenzophenone, 4,4'-dichlorobenzophenone, hydroxybenzophenone, 4-bezoyl-4'-methyl-diphenyl sulfide, acrylated benzophenone, 3,3', 4,4'-tetra(t-butylperoxycarbonyObenzophenone, and 3,3'-dimethyl-4-methoxybenzophenone; thioxanthones such as 2-isopropylthioxanthone, 2,4-dimethylthioxanthone, 2,4-diethylthioxanthone, and 2,4-dichlorothioxanthone; aminobenzophenones such as Michler's ketone, and 4,4'-diethylaminobenzophenone; 10-butyl-2-chloroacridone, 2-ethylanthraquinone, 9,10-phenanthrenequinone, and camphorquinone.

Examples of the cationic photopolymerization initiator include a photoacid-generating agent. Examples of the photoacid-generating agent include compounds used for chemical amplification type photoresists or photo-cationic polymerization (refer to pages 187 to 192 of "Imaging Yo Yuki Zairyo (Organic Materials Used for Imaging Applications)" edited by The Japanese Research Association for Organic Electronics Materials published by Bunshin Publishing (1993)).

The content of the photopolymerization initiator in the actinic radiation-curable inkjet ink may vary depending on the types of actinic radiation and photocurable compound, and it is preferably from 0.01 mass % to 10 mass %.

If necessary, the actinic radiation-curable inkjet ink may further comprise a photopolymerization initiator auxiliary agent, a polymerization inhibitor, or the like. The photopolymerization initiator auxiliary agent can be a tertiary amine compound and is preferably an aromatic tertiary amine compound. Examples of the aromatic tertiary amine compound include N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxyethylaniline, triethylamine, and N,N-dimethylhexylamine. Among them, N,N-dimethylamino-p-benzoic acid ethyl ester and N,N-dimethylamino-p-benzoic acid isoamyl ethyl ester are preferable. These compounds may be used singly, or two or more types of these compounds may be used in combination.

Examples of the polymerization inhibitor include (alkyl) phenol, hydroquinone, catechol, resorcin, p-methoxyphenol, t-butylcatechol, t-butylhydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferrone, aluminum N-nitrosophenyl-hydroxylamine, tri-p-nitrophenylmethyl, N-(3-oxyanilino-1,3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime.

(Gelling Agent)

The actinic radiation-curable color inks for use in the present invention refer to sol-gel phase transition type inks each comprising a gelling agent.

When the gelling agent is crystallized in an ink, a space three-dimensionally surrounded by crystals, a crystallization product of the gelling agent, is preferably formed so that the photocurable compound is included in the space. A structure in which a photocurable compound is included in a space three-dimensionally surrounded by crystals of the gelling agent may be referred to as a "card house structure". Once the card house structure is formed, the liquid photocurable compound can be maintained therein and ink droplets can be pinned. Accordingly, color mixing among liquid droplets can be prevented. From the viewpoint of forming the card house structure, the photocurable compound and the gelling agent which are dissolved in the inks are preferably compatible each other.

For stably discharging the droplets of the ink from an inkjet recording apparatus, it is required that compatibility between the photocurable compound and the gelling agent should be good in an ink in a sol state (at high temperatures, for example, approximately 80° C.).

Examples of the gelling agent include:

aliphatic ketone compounds; aliphatic ester compounds; petroleum wax such as paraffin wax, microcrystalline wax, and petrolatum; plant wax such as candelilla wax, carnauba wax, rice bran wax, Japan wax, jojoba oil, jojoba solid wax, and jojoba esters; animal wax such as beeswax, lanoline, and whale wax; mineral wax such as montan wax and hydrogenated wax; hydrogenated castor oil and hydrogenated castor oil derivatives; modified wax such as montan wax derivatives, paraffin wax derivatives, microcrystalline wax derivatives, or polyethylene wax derivatives; higher fatty acids such as behenic acid, arachidic acid, stearic acid, palmitic acid, myristic acid, lauric acid, oleic acid, and erucic acid; higher alcohols such as stearyl alcohol and behenyl alcohol; hydroxystearic acids such as 12-hydroxystearic acid; 12-hydroxystearic acid derivatives; fatty acid amides such as lauric acid amide, stearic acid amide, behenic acid amide, oleic acid amide, erucic acid amide, ricinoleic acid amide, 12-hydroxystearic acid amide (for example, NIKKA AMIDE series manufactured by Nippon Kasei Chemical Company Limited, ITOWAX series manufactured by Itoh Oil Chemicals Co., Ltd., FATTYAMID series manufactured by Kao Corporation); N-substituted fatty acid amides such as N-stearyl stearic acid amide and N-oleyl palmitic acid amide; special fatty acid amides such as N,N'-ethylene-bis-stearyl amide, N,N'-ethylene-bis-12-hydroxystearyl amide, and N,N'-xylylene-bis-stearyl amide; higher amines such as dodecylamine, tetradecylamine, or octadecylamine; fatty acid ester compounds such as stearyl stearate, oleyl palmitate, glycerin fatty acid esters, sorbitan fatty acid esters, propylene glycol fatty acid esters, ethylene glycol fatty acid esters, and polyoxyethylene fatty acid esters (for example, EMALLEX series manufactured by Nihon Emulsion Co., Ltd., RIKEMAL series manufactured by RIKEN VITAMIN CO., LTD., and POEM series manufactured by RIKEN VITAMIN CO., LTD.); esters of a sucrose fatty acid such as sucrose stearate and sucrose palmitate (for example, RYOTO Sugar Ester series manufactured by Mitsubishi-Chemical Foods Corporation); synthetic wax such as polyethylene wax and α-olefin-maleic anhydride copolymer wax (such as UNILIN series manufactured by Baker Petrolite—Coatings); dimer acids; dimer diols (such as PRIPOR series manufactured by Croda International Plc); inulin fatty acid esters such as stearoyl inulin; dextrin fatty acid esters such as dextrin palmitate and dextrin myristate (such as The Rheopearl series manufactured by Chiba Flour Milling Co., Ltd.); glyceryl behenate/eicosadioate; polyglyceryl behenate/eicosadioate (such as NOMCORT series manufactured by The Nisshin OilliO Group, Ltd.); amide compounds such as N-lauroyl-L-glutamic acid dibutyl amide and N-(2-ethylhexanoyl)-L-glutamic acid dibutyl amide (available from Ajinomoto Fine-Techno Co., Inc.); dibenzylidene sorbitols such as 1,3:2,4-bis-O-benzylidene-D-glycitol (GELL ALL D available from New Japan Chemical Co., Ltd.); and low-molecular oil gelling agents described in Japanese Patent Application Laid-Open Nos. 2005-126507, 2005-255821, and 2010-111790.

The actinic radiation-curable inkjet ink according to the present invention comprises a gelling agent A containing a $C_{12-26}$ straight-chain alkyl group as the gelling agent. When the gelling agent contains the $C_{12-26}$ straight-chain alkyl group, the above-described "card house structure" is easily formed. The gelling agent may contain a branched chain in the structure thereof.

Specific examples of the gelling agent containing a $C_{12-26}$ straight-chain alkyl group include aliphatic ketone compounds, aliphatic ester compounds, higher fatty acids, higher alcohols, and fatty acid amides each having a $C_{12-26}$ straight-chain alkyl group.

The gelling agent is preferably an aliphatic ketone compound or an aliphatic ester compound. That is, the gelling agent is preferably a compound represented by the following formula (G1) or (G2).

R1-CO—R2　　　　　　　　Formula (G1):

R3-COO—R4　　　　　　　Formula (G2):

In formulas (G1) and (G2), R1 to R4 each independently represent an alkyl group containing a $C_{12-26}$ straight-chain moiety. R1 to R4 may contain a branched moiety.

The alkyl group represented by R1 and by R2 in formula (G1) are not particularly limited and are each preferably an alkyl group containing a $C_{12-26}$ straight-chain moiety.

Examples of the aliphatic ketone compound represented by the formula (G1) include dilignoceryl ketone (C24-C24), dibehenyl ketone (C22-C22), distearyl ketone (C18-C18), dieicosyl ketone (C20-C20), dipalmityl ketone (C16-C16), dimyristyl ketone (C14-C14), dilauryl ketone (C12-C12), lauryl myristyl ketone (C12-C14), lauryl palmityl ketone (C12-C16), myristyl palmityl ketone (C14-C16), myristyl stearyl ketone (C14-C18), myristyl behenyl ketone (C14-C22), palmityl stearyl ketone (C16-C18), palmityl behenyl ketone (C16-C22), and stearyl behenyl ketone (C18-C22).

Examples of commercially available compounds represented by formula (G1) include 18-Pentatriacontanon (manufactured by Alfa Aeser), Hentriacontan-16-on (manufactured by Alfa Aeser), and Kao Wax T1 (manufactured by Kao Corporation). The aliphatic ketone compounds may be contained in the inks singly or as a mixture of two or more types thereof.

The alkyl group represented by R3 and by R4 in formula (G1) are not particularly limited and are each preferably an alkyl group containing a $C_{12-26}$ straight-chain moiety.

Examples of the aliphatic ester compound represented by formula (G2) include behenyl behenate (C21-C22), icosyl icosanoate (C19-C20), stearyl stearate (C17-C18), palmityl stearate (C17-C16), lauryl stearate (C17-C12), cetyl palmitate (C15-C16), stearyl palmitate (C15-C18), myristyl myristate (C13-C14), cetyl myristate (C13-C16), octyldodecyl myristate (C13-C20), stearyl oleate (C17-C18), stearyl erucate (C21-C18), stearyl linoleate (C17-C18), behenyl oleate (C18-C22), myricyl cerotate (C25-C16), stearyl montanate (C27-C18), behenyl montanate (C27-C22), arachidyl linoleate (C17-C20), and palmityl triacontanoate (C29-C16).

Examples of commercially available aliphatic ester compounds represented by formula (G2) include UNISTAR M-2222SL (manufactured by NOF CORPORATION), EXCEPARL SS (manufactured by Kao Corporation), EMALEX CC-18 (manufactured by Nihon Emulsion Co., Ltd.), AMREPS PC (manufactured by KOKYU ALCOHOL KOGYO CO., LTD.), EXCEPARL MY-M (manufactured by Kao Corporation), Spermaceti (manufactured by NOF CORPORATION), EMALEX CC-10 (manufactured by Nihon Emulsion Co., Ltd.) These commercially available products are often mixtures of two or more types of the aliphatic ester compounds and therefore may be separated/purified, if necessary.

Besides, a fatty acid ester compound such as a glycerin fatty acid ester, a sorbitan fatty acid ester, a propylene glycol fatty acid ester, an ethylene glycol fatty acid ester, or a polyoxyethylene fatty acid ester (for example, EMALLEX series manufactured by Nihon Emulsion Co., Ltd, RIKEMAL series manufactured by RIKEN VITAMIN CO., LTD., or POEM series manufactured by RIKEN VITAMIN CO., LTD.) may be used in combination in order to adjust the crystal growth of the gelling agent.

The actinic radiation-curable color inks for use in the present invention refer to sol-gel phase transition type inks each comprising a gelling agent. The content of the gelling agent in the gel inks is preferably 1 mass % or more and less than 15 mass %, more preferably 1 mass % or more and less than 7 mass %, and still more preferably 1 mass % or more and 5 mass % or less.

The gelation temperature of the actinic radiation-curable inkjet ink for use in the present invention is 30° C. or higher and 100° C. or lower, and preferably 30° C. or higher and 80° C. or lower. Particularly, a low-temperature gel-based ink having a gelation temperature of 30° C. or higher and 60° C. or lower is preferable from the viewpoint of reducing power consumption because the temperature of a recording medium during printing can be controlled to be low.

Examples of the gelling agent that is suitable for preparing a low-temperature gel-based ink include aliphatic ester compounds such as behenyl behenate, stearyl stearate, behenyl stearate, and ethylene glycol distearate.

(Colorant)

The colorant contained in the actinic radiation-curable inkjet ink can be a dye or a pigment, and the pigment is preferable because it has good dispersibility in ink constituents and is excellent in weather resistance. The pigment is not particularly limited and can be, for example, an organic pigment or an inorganic pigment of any of the following numbers described in Color Index.

Examples of red or magenta pigments include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177 178, 179, 184, 185, 208, 216, 226, and 257, Pigment Violet 3,19, 23, 29, 30, 37, 50, and 88, and Pigment Orange 13, 16, 20, and 36. Examples of blue or cyan pigments include Pigment Blue 1, 15, 15:1, 15:2, 15:3, 15:4, 15:6, 16, 17-1, 22, 27, 28, 29, 36, and 60. Examples of green pigments include Pigment Green 7, 26, 36, and 50. Examples of yellow pigments include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193. Examples of black pigments include Pigment Black 7, 28, and 26.

Examples of commercially available pigments include CHROMOFINE YELLOW 2080, 5900, 5930, AF-1300, and 2700L, CHROMOFINE ORANGE 3700L and 6730, CHROMOFINE SCARLET 6750, CHROMOFINE MAGENTA 6880, 6886, 6891N, 6790, and 6887, CHROMOFINE VIOLET RE, CHROMOFINE RED 6820 and 6830, CHROMOFINE BLUE HS-3, 5187, 5108, 5197, 5085N, SR-5020, 5026, 5050, 4920, 4927, 4937, 4824, 4933GN-EP, 4940, 4973, 5205, 5208, 5214, 5221, and 5000P, CHROMOFINE GREEN 2GN, 2G0, 2G-550D, 5310, 5370, and 6830, CHROMOFINE BLACK A-1103, SEIKAFAST YELLOW 10GH, A-3, 2035, 2054, 2200, 2270, 2300, 2400 (B), 2500, 2600, ZAY-260, 2700 (B), and 2770, SEIKAFAST RED 8040, C405 (F), CA120, LR-116, 1531B, 8060R, 1547, ZAW-262, 1537B, GY, 4R-4016, 3820, 3891, and ZA-215, SEIKAFAST CARMINE 6B1476T-7, 1483LT, 3840, and 3870, SEIKAFAST BORDEAUX 10B-430, SEIKA LIGHT ROSE R40, SEIKA LIGHT VIOLET B800 and 7805, SEIKAFAST MAROON 460N, SEIKAFAST ORANGE 900 and 2900, SEIKA LIGHT BLUE C718 and A612, and CYANINE BLUE 4933M, 4933GN-EP, 4940, and 4973 (all manufactured by Dainichiseika Color & Chemicals Mfg. Co., Ltd.);

KET Yellow 401, 402, 403, 404, 405, 406, 416, and 424, KET Orange 501, KET Red 301, 302, 303, 304, 305, 306, 307, 308, 309, 310, 336, 337, 338, and 346, KET Blue 101, 102, 103, 104, 105, 106, 111, 118, and 124, and KET Green 201 (all manufactured by DIC Corporation);

Colortex Yellow 301, 314, 315, 316, P-624, 314, U10GN, U3GN, UNN, UA-414, and U263, Finecol Yellow T-13 and T-05, Pigment Yellow 1705, Colortex Orange 202, Colortex Red 101, 103, 115, 116, D3B, P-625, 102, H-1024, 105C, UFN, UCN, UBN, U3BN, URN, UGN, UG276, U456, U457, 105C, and USN, Colortex Maroon 601, Colortex Brown B610N, Colortex Violet 600, Pigment Red 122, Colortex Blue 516, 517, 518, 519, A818, P-908, and 510, Colortex Green 402 and 403, and Colortex Black 702 and U905 (all manufactured by SANYO COLOR WORKS, Ltd.);

Lionol Yellow 1405G, Lionol Blue FG7330, FG7350, FG7400G, FG7405G, ES, and ESP-S (all manufactured by Toyo Ink SC Holdings Co., Ltd.), Toner Magenta E02, Permanent Rubin F6B, Toner Yellow HG, Permanent Yellow GG-02, and Hostapeam Blue B2G (all manufactured by Hoechst Industry Ltd.);

Novoperm P-HG, Hostaperm Pink E, and Hostaperm Blue B2G (all manufactured by Clariant International Ltd); and Carbon black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44, and CF9 (all manufactured by Mitsubishi Chemical Corporation).

Dispersing the pigment can be performed, for example, by using a ball mill, a sand mill, an attritor, a roll mill, an agitator, a Henschel mixer, a colloid mill, an ultrasound homogenizer, a pearl mill, a wet jet mill, a paint shaker. Dispersing the pigment is preferably performed such that the volume average particle size of the pigment particles is preferably from 0.08 to 0.5 μm, and the maximum particle size is preferably from 0.3 to 10 μm, and more preferably from 0.3 to 3 μm. Dispersing the pigment is controlled by the selection of the pigment, a dispersant, and a dispersion medium, dispersion conditions, filtration conditions, and the like.

The actinic radiation-curable inkjet ink may further comprise a dispersant in order to improve the dispersibility of the pigment. Examples of the dispersant include hydroxy group-containing carboxylic acid esters, salts of long chain polyaminoamides and high molecular weight acid esters, salts of high molecular weight polycarboxylic acids, salts of long chain polyaminoamides and polar acid esters, high molecular weight unsaturated acid esters, high molecular weight copolymers, modified polyurethane, modified polyacrylate, anionic surfactants of polyether ester type, naphthalenesulfonic acid-formalin condensate salts, aromatic sulfonic acid-formalin condensate salts, polyoxyethylene alkyl phosphoric acid esters, polyoxyethylene nonyl phenyl ether, and stearylamine acetate. Examples of commercially available dispersants include SOLSPERSE series of Avecia, and PB series of Ajinomoto Fine-Techno Co., Inc.

If necessary, the actinic radiation-curable inkjet ink may further comprise a dispersion promotor. The dispersion promotor can be selected according to the pigment.

The total amount of the dispersant and the dispersion promotor is preferably from 1 to 50 mass % relative to the mass of the pigment.

If necessary, the actinic radiation-curable inkjet ink may further comprise a dispersion medium for dispersing the pigment. A solvent may be contained as the dispersion medium in the ink; however, the photocurable compound as described above (particularly, low viscous monomer) is preferably used as the dispersion medium in order to prevent the solvent from remaining in a formed image.

The dye can be an oil soluble dye or the like. Examples of the oil soluble dye include the following various dyes. Examples of magenta dyes include MS Magenta VP, MS Magenta HM-1450, MS Magenta HSo-147 (all manufactured by Mitsui Chemicals, Inc.), AIZEN SOT Red-1, AIZEN SOT Red-2, AIZEN SOT Red-3, AIZEN SOT Pink-1, SPIRON Red GEH SPCIAL (all manufactured by Hodogaya Chemical Co., Ltd.), RESOLIN Red FB 200%, MACROLEX Red Violet R, MACROLEX ROT5B (all manufactured by Bayer Japan), KAYASET Red B, KAYASET Red 130, KAYASET Red 802 (all manufactured by Nippon Kayaku Co., Ltd.), PHLOXIN, ROSE BENGAL, ACID Red (all manufactured by Daiwa Kasei Co., Ltd.), HSR-31, DIARESIN Red K (all manufactured by Mitsubishi Chemical Corporation), and Oil Red (manufactured by BASF Japan Ltd.).

Examples of cyan dyes include MS Cyan HM-1238, MS Cyan HSo-16, Cyan HSo-144, MS Cyan VPG (all manufactured by Mitsui Chemicals, Inc.), AIZEN SOT Blue-4 (manufactured by Hodogaya Chemical Co., Ltd.), RESOLIN BR. Blue BGLN 200%, MACROLEX Blue RR, CERES Blue GN, SIRIUS SUPRA TURQ. Blue Z-BGL, SIRIUS SUPRA TURQ. Blue FB-LL 330% (all manufactured by Bayer Japan), KAYASET Blue FR, KAYASET Blue N, KAYASET Blue 814, Turq. Blue GL-5 200, Light Blue BGL-5 200 (all manufactured by Nippon Kayaku Co., Ltd.), DAIWA Blue 7000, Oleosol Fast Blue GL (all manufactured by Daiwa Kasei Co., Ltd.), DIARESIN Blue P (manufactured by Mitsubishi Chemical Corporation), SUDAN Blue 670, NEOPEN Blue 808, and ZAPON Blue 806 (all manufactured by BASF Japan Ltd.).

Example of yellow dyes include MS Yellow HSm-41, Yellow KX-7, Yellow EX-27 (all manufactured by Mitsui Chemicals, Inc.), AIZEN SOT Yellow-1, AIZEN SOT Yellow-3, AIZEN SOT Yellow-6 (all manufactured by Hodogaya Chemical Co., Ltd.), MACROLEX Yellow 6G, MACROLEX FLUOR. Yellow 10GN (all manufactured by Bayer Japan), KAYASET Yellow SF-G, KAYASET Yellow 2G, KAYASET Yellow A-G, KAYASET Yellow E-G (all manufactured by Nippon Kayaku Co., Ltd.), DAIWA Yellow 330HB (manufactured by Daiwa Kasei Co., Ltd.), HSY-68 (manufactured by Mitsubishi Chemical Corporation), SUDAN Yellow 146, and NEOPEN Yellow 075 (all manufactured by BASF Japan Ltd.). Examples of black dyes include MS Black VPC (manufactured by Mitsui Chemicals, Inc.), AIZEN SOT Black-1, AIZEN SOT Black-5 (all manufactured by Hodogaya Chemical Co., Ltd.), RESORIN Black GSN 200%, RESOLIN Black BS (all manufactured by Bayer Japan), KAYASET Black A-N (manufactured by Nippon Kayaku Co., Ltd.), DAIWA Black MSC (manufactured by Daiwa Kasei Co., Ltd.), HSB-202 (manufactured by Mitsubishi Chemical Corporation), NEPTUNE Black X60, and NEOPEN Black X58 (all manufactured by BASF Japan Ltd.).

The content of the pigment or the dye is preferably from 0.1 to 20 mass %, and more preferably from 0.4 to 10 mass % relative to the mass of the actinic radiation-curable inkjet ink. The reason is that when the content of the pigment or the dye is excessively low, color exhibition of an image to be obtained is insufficient, and on the other hand, when the content is excessively high, the ink viscosity is increased to lower the jetting ability.

(Additional Components)

If necessary, the actinic radiation-curable inkjet ink may further comprise other component(s). The additional components can be various additives and other resins. Examples of the additives include surfactants, leveling agents, matting agents, UV absorbers, IR absorbers, antibacterial agents, and basic compounds for improving the storage stability of the ink. Examples of the basic compounds include basic alkali metal compounds, basic alkali earth metal compounds, and basic organic compounds such as amines. Examples of the other resins include resins for adjusting the physical properties of a cured film, and examples of the resins include polyester resins, polyurethane resins, vinyl resins, acrylic resins, and rubber resins.

The actinic radiation-curable inkjet ink can be obtained by mixing the above-described photocurable compound, gelling agent, and colorant, and other optional components such as the photopolymerization initiator under heating. The mixed liquid obtained is preferably filtered through a predetermined filter.

<Ink Set>

The ink set for use in the present invention comprises at least two actinic radiation-curable color inks described above, and in a case where a number of color inks contained in the ink set is two, the ink set satisfies only the following condition (a) of the following conditions (a) and (b), or in a case where a number of color inks contained in the ink set is three or more, the ink set satisfies all of the following condition (a) and the following condition (b):

(a) a gelation temperature of a color ink on a most downstream side is 3.0° C. to 15.0° C. higher than a gelation temperature of a color ink on a most upstream side; and (b) a gelation temperature of a second or subsequent color ink from an upstream side in a conveyance direction is the same as a gelation temperature of an adjacent color ink on an upstream side or higher than a gelation temperature of an adjacent color ink on an upstream side.

Figure 2:
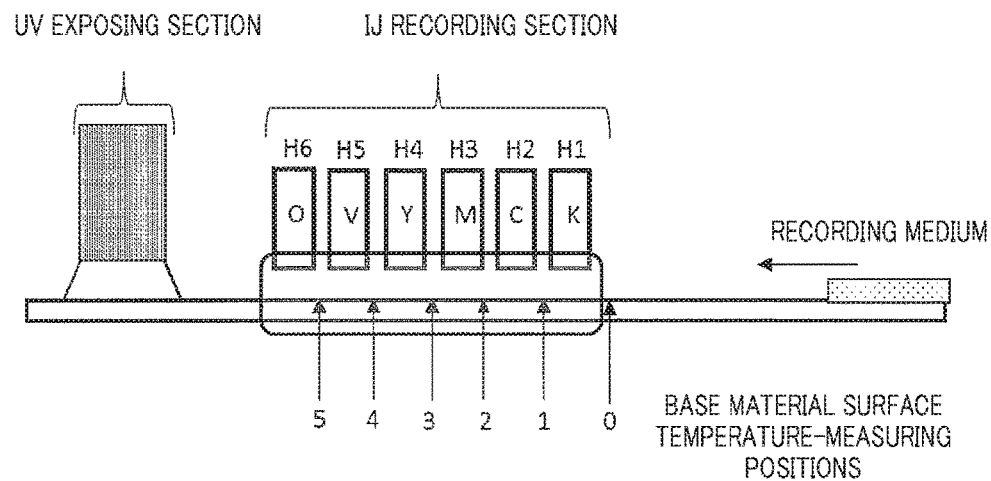
FIG. 2 shows a schematic diagram illustrating positions where a surface temperature of a recording medium is measured when printing with an inkjet recording apparatus of single pass recording type is performed using an ink set of 6 colors and a graph showing changes in the surface temperatures of recording media versus the measuring position.
Figure 2:
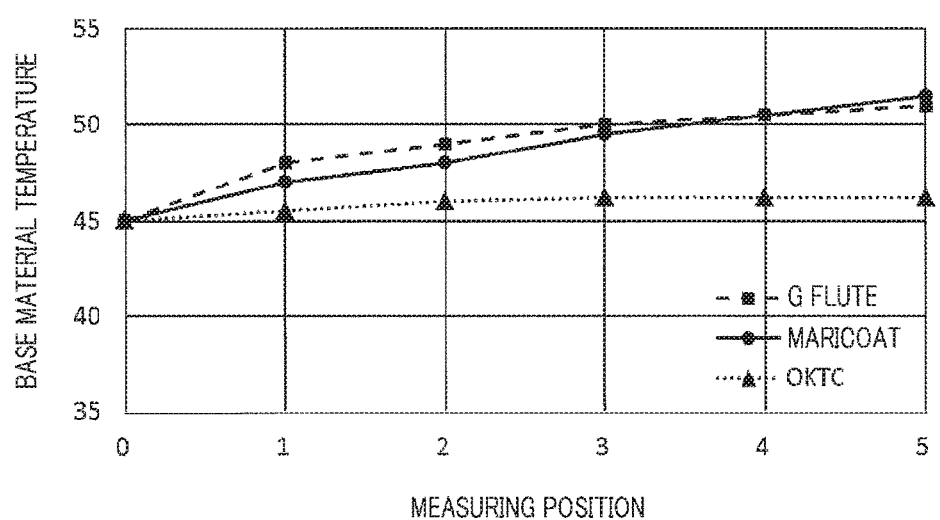

The recording method according to the present invention is a method for forming a high-quality color image on a recording medium having a high heat storage property, the recording medium having a thermal conductivity of less than 0.10 W/(m·K) and having a thickness of 0.4 mm or more. This method is based on the knowledge that a recording medium having a low thermal conductivity stores heat and the temperature of the recording medium rises during printing. For example, in the measurement illustrated in FIG. 1 and in FIG. 2, printing on thin corrugated cardboard (G flute) (thermal conductivity: 0.06 W/(m·K), thickness: 0.90 mm), coated white lined board paper (Maricoat) (thermal conductivity: 0.06 W/(m·K), thickness: 0.60 mm), and coated paper (OKTC, OK Top Coat) (thermal conductivity: 0.06 W/(m·K), thickness: 0.01 mm) is performed with an inkjet recording apparatus of single pass recording type in which the temperature of the recording medium is set at 45° C., and the surface temperature of each recording medium during printing is measured using a noncontact thermometer (BA-06TA-S manufactured by OPTEX CO., LTD.). The temperature-measuring position in this case is immediately before a recording head of each color ink (positions 0 to 3 in FIG. 1 and positions 0 to 5 in FIG. 2). As a result, the temperature change between the upstream side (position 0) and the downstream side (position 3 in FIG. 1 or position 5 in FIG. 2) in the conveyance direction of the recording medium is only slight (about 1° C.) for the surface temperature of the thin coated paper. It is considered that this is because the heat brought in the recording medium diffuses to the conveyance stand side. On the other hand, in the case of the thin corrugated cardboard and the thick coated white lined board paper each having a low thermal conductivity, the surface temperature of each recording medium measured immediately before the head of the ink to be printed finally (position 3 in FIG. 1 or position 5 in FIG. 2) is 6° C. or more higher than the surface temperature of the recording medium immediately before the start of the printing. It is considered that when a large amount of heat transmitted from the ink to the recording medium at the time of landing of the gel ink and radiant heat of the head applied to the recording medium in conveying the recording medium are stored in the recording medium, such temperature rise occurs.

Accordingly, when printing on the thin corrugated cardboard or the like is performed, the temperature of the recording medium at the time of printing with the last ink positioned on the downstream side becomes higher than the temperature of the recording medium at the time of printing with the first ink positioned on the upstream side because of the heat storage by the recording medium. When the surface temperature of the recording medium is higher than the gelation temperature of an ink, an ink droplet landed on the surface of the recording medium is hard to undergo gelation, and therefore the pinning property and the leveling property of the ink are lowered, so that the difference in glossiness, the color unevenness, and the blank are liable to occur in an image. In the present invention, to overcome such problems, all the color inks are cured within the same time from the time when the inks are landed by making the gelation temperatures of the inks high according to the rise in the surface temperature of the recording medium, namely by setting the gelation temperature of a color ink to be printed finally to be higher than the gelation temperature of a color ink to be printed first, so that formation of a high-quality color image without the difference in glossiness or the color unevenness is made possible.

The gelation temperature of the color ink positioned on the most upstream side in the ink set for use in the present invention, namely the color ink to be jetted first, is 30° C. or higher and 100° C. or lower, preferably 30° C. or higher and 80° C. or lower, and more preferably 30° C. or higher and 60° C. or lower. Since the gelation temperature of the color ink positioned on the most downstream side, namely the color ink to be jetted finally, must be made higher than the gelation temperature of the color ink to be jetted first in the present invention, the gelation temperature of the color ink to be recorded first may be determined taking into consideration the gelation temperature of the color ink to be jetted finally.

The gelation temperature of the color ink positioned on the most downstream side in the ink set, namely the color ink to be jetted finally, satisfies the condition (a). Specifically, the gelation temperature of the color ink positioned on the most downstream side is 3.0° C. to 15.0° C. higher, preferably 3.0° C. to 10.0° C. higher, and more preferably 3.0° C. to 8.0° C. higher than the gelation temperature of the color ink on the most upstream side. In the case where the difference between the gelation temperature of the color ink to be jetted first and the gelation temperature of the color ink to be jetted finally is less than 3.0° C., the effect obtained by setting the gelation temperature of the color ink to be jetted finally to be higher is insufficient and a high-quality image cannot be printed on a recording medium having a high heat storage property.

In the case where the number of colors included in the ink set is two, only the condition (a) may be satisfied, but in the case where three or more color inks are included in the ink set, the condition (b) must be satisfied together with the condition (a). Specifically, the inks are designed such that the gelation temperature of the second or subsequent color ink from the upstream side in the conveyance direction is the same as the gelation temperature of the adjacent color ink on the upstream side or higher than the gelation temperature of the adjacent color ink on the upstream side. The object of the present invention is to perform printing on a recording medium that stores heat, and therefore the gelation temperatures of the inks on the downstream side have to be changed according to the amount of heat stored in the recording medium. The amount of heat stored in the recording medium refers to the difference between the temperature of the recording medium immediately before printing and the temperature of the recording medium at the position where the ink is discharged. In addition, it is generally known that in the case where the temperature rise of a recording medium does not occur, when the difference in the gelation temperature between respective inks is less than ±3° C., variation of image quality among colors does not occur and the image quality is high. In other words, the gelation temperature of the inks has an allowable range of ±3° C. for achieving high image quality. Accordingly, when the heat storage of the recording medium and the allowable range of the gelation temperature are taken into consideration, the gelation temperature of the ink to be printed second or later is represented by (gelation temperature of first ink)+(amount of heat stored in recording medium)±(range of less than 3° C.). The effects according to the present invention can be achieved as long as this condition is satisfied even if the gelation temperature of the ink to be printed second or later is the same as the gelation temperature of an ink printed immediately before.

In the ink set for use in the present invention, the gelation temperatures of all the inks at intermediate positions may be the same as the gelation temperature of the ink to be jetted first, or the gelation temperatures of the inks at intermediate positions may become higher in stages. Although the difference between the gelation temperatures of adjacent two inks is not particularly limited, the gelation temperatures of inks disposed between the first ink and the last ink are also preferably changed in stages according to the temperature rise of the recording medium. Specifically, in the case where the gelation temperatures of two adjacent inks are different, the difference between the gelation temperatures thereof is preferably from 1° C. to 5° C., and more preferably in a range from 1° C. to 3° C. When an ink set in which all the color inks have a different gelation temperature, and the gelation temperatures are raised gradually from the upstream side to the downstream side is used, formation of a high-quality image is made possible irrespective of the types of recording media because the gelation temperatures of inks are strictly changed according to the temperature rise of the recording medium.

Various methods for adjusting the gelation temperature of a color ink are known, and the gelation temperature can be changed, for example, by changing the type of the photocurable compound or the type and amount to be added of the gelling agent. To obtain the ink set for use in the present invention, one ink is first prepared to measure the gelation temperature thereof, and subsequently the composition of the ink is changed slightly, so that the inks having a different gelation temperature can be prepared. As one example, the gelation temperature can be made high by increasing the amount of the gelling agent. Accordingly, a plurality of inks is prepared to measure the gelation temperature of each ink, and then an ink set may be prepared by combining inks each having a desired gelation temperature. It is to be noted that the gelation temperatures of the inks can be obtained from the temperature changes in the dynamic viscoelasticity of the inks which are measured with a rheometer. Specifically, a temperature change curve of viscosity is made by heating an ink to 100° C. and then cooling the ink to 20° C. with conditions including a shear rate of 11.7/s and a temperature decrease rate of 0.1° C./s, and the gelation temperature can be obtained as a temperature where the viscosity is 200 mPa·s.

The number of colors included in the ink set for use in the present invention is not particularly limited as long as it is two or more, and an ink set of 4 colors or 6 colors is general. Also, the color included in the ink set is not particularly limited, and the ink set preferably comprises 4 color inks of yellow (Y), magenta (M), cyan (C), and black (K), and other color ink(s). Examples of the other color inks other than the 4 color inks include, but not limited to, orange (O), violet (V), green (G), and white (W).

Also, the order of recording colors is not particularly limited, but the more downstream side the recording position is on, the higher the possibility that the image quality deteriorates becomes, and therefore an ink having the highest brightness is preferably disposed at the most downstream side in order to record the ink finally because the deterioration in image quality recorded using the ink is difficult to recognize visually, if any. For example, inks can be disposed such that the brightness becomes higher from the upstream side toward the downstream side. In the case where 4 colors of YMCK are used, it is preferable to record K first and record Y finally, and more preferably recording is performed in the order of K, C, M, and Y.

<Recording Medium>

The recording medium for use in the present invention refers to a recording medium having a thermal conductivity of less than 0.10 W/(m·K) and having a thickness of 0.4 mm or more. The type of the recording medium is not particularly limited, and examples thereof include a base material made of paper, coated paper obtained by coating both surfaces of base paper with a resin or the like, various kinds of laminated paper, synthetic paper, thin corrugated cardboard, and various non-absorbent plastics and films thereof. Particularly when the recording method according to the present invention is used for printing on paper having a basis weight of 200 g/m² or more, or for printing on thin corrugated cardboard comprising a corrugated medium and a liner, a high-quality color image can be obtained.

<Recording Method>

In the first step of the recording method according to the present invention, the actinic radiation-curable ink as described above is discharged from an inkjet recording head to land on a recording medium. The inkjet recording head for discharging the actinic radiation-curable ink is of a single pass recording type (also referred to as a line type).

In the single pass recording type, discharge nozzles for each color ink are provided in line over a width direction (direction orthogonal to conveyance direction of recording medium) of a printer, and, for example, the discharge nozzles for black (K), yellow (Y), magenta (M), cyan (C), and the like are provided in line.

In the case where the actinic radiation-curable ink is discharged in the inkjet recording apparatus, the ink may be discharged by installing a heating apparatus to a head installed in the inkjet recording apparatus and heating the ink, thereby lowering the ink viscosity. The temperature for heating the ink is preferably from 25 to 150° C., and more preferably from 30 to 70° C. In the case where the temperature for heating the ink is less than 25° C., there is a risk that the viscosity of the ink cannot be lowered, and in the case where the temperature for heating the ink exceeds 150° C., there is a risk that the ink is cured. The temperature for heating the ink is decided taking into consideration the curability of the photocurable compound and photopolymerization initiator versus heat and is set to be lower than the temperature where curing starts by heat.

Examples of the method for heating an inkjet ink to a predetermined temperature include a method of heating at least any of an ink supplying system including an ink tank that constitutes a head carriage, a supply pipe, an anterior ink tank immediately before the recording head, and the like; filter-attached piping; a piezo head; and the like to a predetermined temperature by any of a panel heater, a ribbon heater, temperature-regulated water, and the like.

The drop volume of the inkjet ink when discharged is preferably 2 pL or more and 20 pL or less from the viewpoint of making the recording speed fast and improving the image quality.

Further, in the inkjet recording method according to the present invention, the recording medium may be heated although it depends on the gelation temperature and the like of the actinic radiation-curable ink to be used. By heating the recording medium, the drying speed and the viscosity increase speed of the ink can be improved remarkably, and therefore a high image quality is obtained, and besides, the durability of the formed image is improved. The temperature of the recording medium (base material temperature) is in a range from 35° C. to 80° C., and preferably in a range from 35° C. to 60° C. In the case where the recording medium is heated, various heaters, heating rollers and the like for heating the recording medium through contact heating may be used, or a lamp and the like for heating the surface or the back surface of the recording medium through noncontact heating may be used. The heating means for heating the recording medium through contact heating is usually disposed on the back surface of the recording medium.

In the inkjet recording method according to the present invention, the second step for curing droplets of the actinic radiation-curable ink landed on the recording medium by irradiating the ink droplets with actinic radiation is performed after the first step described above.

Examples of the actinic radiation for use in the second step according to the present invention include ultraviolet rays, near-ultraviolet rays, natural light (including natural light passing through optical cut filter), and ultraviolet rays are preferable. As an irradiation light source for ultraviolet ray irradiation, for example, a mercury lamp, a metal halide lamp, excimer laser, ultraviolet laser, a cold cathode fluorescent lamp, a hot cathode fluorescent lamp, a black light, LED (light emitting diode), and the like are applicable, and a belt-like metal halide lamp, a cold cathode fluorescent lamp, a hot cathode fluorescent lamp, a mercury lamp, or a black light is preferable. The LED is particularly preferable because it has a long life and is inexpensive.

However, the LED is generally a single-wavelength light source, and the illuminance is liable to be lowered than that of a light source having a plurality of bright line spectra, such as a high pressure mercury lamp. In the case where curing is performed through radical polymerization, when the illuminance is low, a radical combines with oxygen to increase a ratio of deactivation. Therefore, even if the irradiation time is extended to make the cumulative light quantity the same, curing is hard to perform. Accordingly, inkjet inks are required to be curable at a low illuminance and a low cumulative light quantity.

The LED has advantages that instantaneous lighting is possible, the life is long, the radiant heat is small in amount, controlling the light quantity is easy, the wavelength width (half-width value) of emitted light is extremely narrow, the power consumption is small in amount, etc. The wavelength of an irradiation light source is preferably from 280 to 420 nm, and more preferably from 350 to 410 nm. The wavelength is a long wavelength in an ultraviolet region and is high in safety.

The cumulative light quantity irradiated onto the droplets of the inkjet ink landed on a recording medium is preferably in a range from 10 to 500 mJ/cm². The cumulative light quantity in the range is advantageous from the viewpoint of energy saving, space saving, and costs.

The illuminance of the light from the irradiation source of actinic radiation is preferably 8 W/cm² or less, and more preferably 2 W/cm² or less on the recording medium. The light whose illuminance is 8 W/cm² or higher generates a large amount of heat, and therefore a recording medium having a weak heat resistance is liable to deform. Moreover, a problem that leaking light becomes large in amount, so that inks are cured on the nozzle surface of a head can occur. Furthermore, the light of high illuminance makes energy consumption high, needs a large space for a light source, and increases costs.

The method for irradiation with actinic radiation is not particularly limited, and the irradiation with the actinic radiation can be performed, for example, by the methods described below. A light source is provided on both sides of a head unit, a head and the light source are scanned by a shuttle method, and irradiation is performed at a certain time after an ink is landed. Further, light irradiation is performed from another light source without drive to complete curing (see Japanese Patent Application Laid-Open No. SHO 60-132767). Alternatively, light irradiation may be performed using an optical fiber, or light irradiation may be performed onto a recording section by reflecting ultraviolet rays from a collimated light source at a mirror surface provided on a side surface of a head unit (see U.S. Pat. No. 6,145,979).

Also, the irradiation with the actinic radiation may be separated into two stages. The first irradiation is preferably performed between 0.001 and 1.0 second after an ink droplet is landed on a recording medium. The second irradiation may be performed after the first irradiation. That is, the second irradiation may be performed on the downstream side of the first irradiation in the conveyance direction of the recording medium. The cumulative light quantity per unit area of the recording medium through the first irradiation (D1) is preferably smaller than the cumulative light quantity per unit area of the recording medium through the second irradiation (D2). That is, it is preferable to satisfy D1<D2. By separating the irradiation with the actinic radiation into two stages, the hardness of an image is improved and an image with little bleeding can be formed.

In the inkjet recording method according to the present invention, the total ink film thickness after an ink is landed on a recording medium and is then irradiated with actinic radiation to be cured is preferably from 2 to 25 μm. The term "total ink film thickness" means the maximum value of the film thickness of an ink drawn on a recording medium. In any of a monochrome, superposition of two colors (secondary color), superposition of three colors, and superposition of four colors (white ink base), the total ink film thickness of these colors is preferably from 0.1 to 5 μm.

<Inkjet Recording Apparatus>

The recording method according to the present invention is performed using an inkjet recording apparatus of single pass recording type (line type). The inkjet recording apparatus of single pass recording type is more desirable than an inkjet recording apparatus of serial type from the viewpoint of high-speed recording.

Figure 3A:
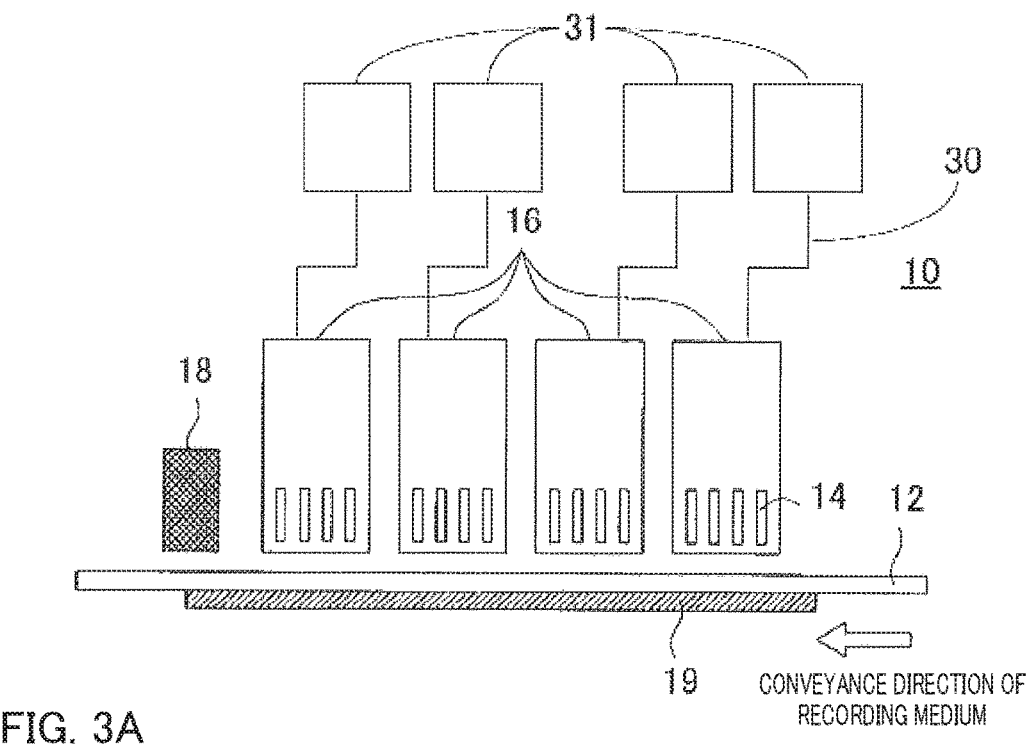
FIG. 3A and FIG. 3B illustrate a diagram showing one example of a configuration of the main part of an inkjet recording apparatus of single pass recording type.
Figure 3B:
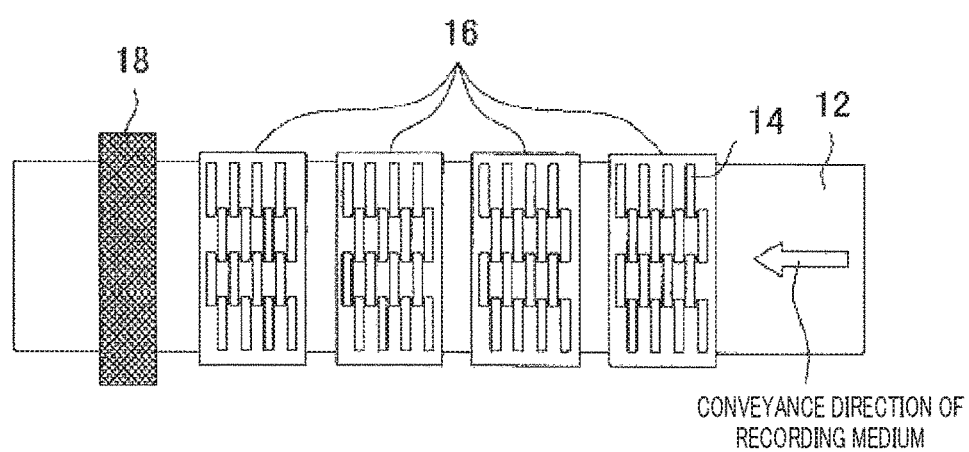

FIG. 3A and FIG. 3B illustrate a diagram showing one example of a configuration of the main part of an inkjet recording apparatus of line recording type. FIG. 3A illustrates a side view, and FIG. 3B illustrates a top view.

As illustrated in FIG. 3A and FIG. 3B, inkjet recording apparatus 10 has head carriage 16 for accommodating a plurality of inkjet recording heads 14, ink channel 30 connected to head carriage 16, ink tank 31 for storing an ink to be supplied via ink channel 30, light irradiation section 18 which covers the entire width of recording medium 12 and which is disposed at a downstream side of head carriage 16

(conveyance direction of recording medium), and temperature control section 19 disposed on a lower face of recording medium 12.

Head carriage 16 is fixedly disposed so as to cover the entire width of recording medium 12 and accommodates a plurality of inkjet recording heads 14 provided for each color. Inkjet recording head 14 is designed so that the ink is supplied. For example, an ink can be supplied directly from a non-illustrated ink cartridge or the like that is added in a freely-mountable manner to inkjet recording apparatus 10 or by non-illustrated means for ink supply.

A plurality of inkjet recording heads 14 is disposed for each color in the conveyance direction of recording medium 12. The number of inkjet recording heads 14 that are disposed in the conveyance direction of recording medium 12 is determined based on the nozzle density of inkjet recording heads 14 and the resolution of an image to be printed. For example, when an image having the resolution of 1,440 dpi is formed by using inkjet recording heads 14 with a drop volume of 2 pl and a nozzle density of 360 dpi, four inkjet recording heads 14 can be disposed in a staggered manner relative to the conveyance direction of recording medium 12. Further, when an image having the resolution of 720×720 dpi is formed by using inkjet recording heads 14 with a drop volume of 6 pl and a nozzle density of 360 dpi, two inkjet recording heads 14 can be disposed in a staggered manner. As described herein, dpi represents the number of ink droplets (dots) per 2.54 cm.

Ink tank 31 is connected to head carriage 16 via ink channel 30. Ink channel 30 is a passage for supplying an ink in ink tank 31 to head carriage 16. For stable discharge of ink droplets, the ink in ink tank 31, ink channel 30, head carriage 16, and inkjet recording head 14 is heated to a predetermined temperature to maintain the gel state.

Light irradiation section 18 covers the entire width of recording medium 12 and it is disposed at a downstream side of head carriage 16 relative to the conveyance direction of recording medium. Light irradiation section 18 irradiates the liquid droplets which have been discharged from inkjet recording head 14 and landed on recording medium 12 with actinic radiation to cure the liquid droplets.

Temperature control section 19 is disposed on the lower face of recording medium 12 and maintains recording medium 12 at a predetermined temperature. Temperature control section 19 can be, for example, one of various heaters.

EXAMPLES

Hereinafter, the present invention will be described specifically giving Examples, but the present invention is not limited to these Examples. It is to be noted that the term "parts" or "%" used in Examples represents "parts by weight" or "mass %" unless otherwise noted.

<Preparation of Pigment Dispersions>

Pigment dispersions of yellow (Y), magenta (M), cyan (C), black (K), violet (V), orange (O), and white (W) were prepared according to the following procedures.

(Preparation of Y Pigment Dispersion)

The following two types of compounds were put into a stainless beaker and then heated at 65° C. on a hot plate for 1 hour under stirring for dissolution.

Pigment dispersant: PB824 (manufactured by Ajinomoto Fine-Techno Co., Inc.) 9 parts by weight Photocurable compound: tripropylene glycol diacrylate 71 parts by weight Subsequently, the solution was cooled to room temperature, 20 parts of the yellow (Y) pigment described below was then added to the solution, and the resultant mixture was put into a glass bottle together with 200 g of zirconia beads having a diameter of 0.5 mm to seal the glass bottle and was then subjected to dispersion treatment with a paint shaker for 8 hours. Thereafter, the zirconia beads were removed to obtain Y pigment dispersion 1.

Yellow pigment: Pigment Yellow 180 (CHROMOFINE YELLOW 6280JC manufactured by Dainichiseika Color & Chemicals Mfg. Co., Ltd.)

(Preparation of M Pigment Dispersion)

An M pigment dispersion was prepared in the same manner as the Y pigment dispersion except that the Y pigment was changed to the magenta (M) pigment described below.

Magenta pigment: Pigment Red 122 (CHROMOFINE RED 6112JC manufactured by Dainichiseika Color & Chemicals Mfg. Co., Ltd.)

(Preparation of C Pigment Dispersion)

A C pigment dispersion was prepared in the same manner as the Y pigment dispersion except that the Y pigment was changed to the cyan (C) pigment described below.

Cyan pigment: Pigment Blue 15:4 (CHROMOFINE BLUE 6332JC manufactured by Dainichiseika Color & Chemicals Mfg. Co., Ltd.)

(Preparation of K Pigment Dispersion)

A K pigment dispersion was prepared in the same manner as the Y pigment dispersion except that the Y pigment was changed to the black (K) pigment described below.

Black pigment: Pigment Black 7 (#52 manufactured by Mitsubishi Chemical Corporation)

(Preparation of V Pigment Dispersion)

A V pigment dispersion was prepared in the same manner as the Y pigment dispersion except that the Y pigment was changed to the violet (V) pigment described below.

Violet pigment: Pigment Violet 23 (P-RL manufactured by DIC Corporation)

(Preparation of O Pigment Dispersion)

An O pigment dispersion was prepared in the same manner as the Y pigment dispersion except that the Y pigment was changed to the orange (O) pigment described below.

Orange pigment: Pigment Orange 64 (K2960 manufactured by BASF SE)

(Preparation of W Pigment Dispersion)

A W pigment dispersion was prepared in the same manner as the Y pigment dispersion except that the Y pigment was changed to the white (W) pigment described below.

White pigment: titanium oxide (TCR-52 manufactured by Sakai Chemical Industry Co., Ltd.)

<Preparation of Inks>

According to the ink compositions described below in Table 1A to Table 1D, respective components and the pigment dispersion were mixed and stirred under heating at 80° C. Each of obtained solutions was filtered through a Teflon® membrane filter (3 μm) manufactured by ADVANTEC under heating and was then cooled to obtain each color ink. Ink sets 1 to 10 were obtained using the obtained inks (Y1 to Y8 inks, M1 to M8 inks, C1 to C8 inks, K1 to K10 inks, V8 ink, O8 ink, and W9 to W10 inks).

TABLE 1A

| Component | Compound name/product name | Ink set 1 | | | | Ink set 2 | | | | Ink set 3 | | | |
|---|---|---|---|---|---|---|---|---|---|---|---|---|---|
| | | Y1 | M1 | C1 | K1 | Y2 | M2 | C2 | K2 | Y3 | M3 | C3 | K3 |
| Gelling agent | Kao Wax T1 | | | | | | | | | 2.0% | | | |
| | UNISTAR M-2222SL | 2.0% | 2.0% | 2.0% | 2.0% | 2.5% | 2.0% | 2.0% | 2.0% | 1.0% | 2.3% | 2.1% | 2.0% |
| | WE11 | | | | | | | | | | | | |
| Actinic radiation-curable compound | 3PO-modified trimethylol-propane triacrylate | 15.0% | 15.0% | 15.0% | 15.0% | 15.0% | 15.0% | 15.0% | 15.0% | 15.0% | 15.0% | 15.0% | 15.0% |
| | Polyethylene glycol #400 diacrylate | 20.0% | 20.0% | 20.0% | 20.0% | 20.0% | 20.0% | 20.0% | 20.0% | 20.0% | 20.0% | 20.0% | 20.0% |
| | 6EO-modified trimethylol-propane triacrylate | 38.8% | 38.8% | 38.8% | 38.8% | 38.3% | 38.8% | 38.8% | 38.8% | 37.8% | 38.5% | 38.7% | 38.8% |
| Polymerization inhibitor | Irgastab UV10 | 0.1% | 0.1% | 0.1% | 0.1% | 0.1% | 0.1% | 0.1% | 0.1% | 0.1% | 0.1% | 0.1% | 0.1% |
| Photo-polymerization initiator | TPO | 6.0% | 6.0% | 6.0% | 6.0% | 6.0% | 6.0% | 6.0% | 6.0% | 6.0% | 6.0% | 6.0% | 6.0% |
| | Irgacure 819 | 3.0% | 3.0% | 3.0% | 3.0% | 3.0% | 3.0% | 3.0% | 3.0% | 3.0% | 3.0% | 3.0% | 3.0% |
| Surfactant | KF-352 | 0.1% | 0.1% | 0.1% | 0.1% | 0.1% | 0.1% | 0.1% | 0.1% | 0.1% | 0.1% | 0.1% | 0.1% |
| Pigment dispersion | | 15.0% | 15.0% | 15.0% | 15.0% | 15.0% | 15.0% | 15.0% | 15.0% | 15.0% | 15.0% | 15.0% | 15.0% |
| Total amount | | 100% | 100% | 100% | 100% | 100% | 100% | 100% | 100% | 100% | 100% | 100% | 100% |
| Gelation temperature of ink (° C.) | | 55 | 55 | 55 | 55 | 60 | 55 | 55 | 55 | 64 | 61 | 58 | 55 |

TABLE 1B

| Component | Compound name/product name | Ink set 4 | | | | Ink set 5 | | | | Ink set 6 | | | |
|---|---|---|---|---|---|---|---|---|---|---|---|---|---|
| | | Y4 | M4 | C4 | K4 | Y5 | M5 | C5 | K5 | Y6 | M6 | C6 | K6 |
| Gelling agent | Kao Wax T1 | 2.0% | 1.3% | 1.2% | 1.2% | 1.0% | 1.5% | 1.2% | 1.2% | | | | |
| | UNISTAR M-2222SL | 1.2% | 1.2% | 1.0% | 0.8% | 1.0% | 1.2% | 1.0% | 0.8% | | | | |
| | WE11 | | | | | | | | | 2.2% | 2.0% | 1.8% | 1.8% |
| Actinic radiation-curable compound | 3PO-modified trimethylol-propane triacrylate | 15.0% | 15.0% | 15.0% | 15.0% | 15.0% | 15.0% | 15.0% | 15.0% | 15.0% | 15.0% | 15.0% | 15.0% |
| | Polyethylene glycol #400 diacrylate | 20.0% | 20.0% | 20.0% | 20.0% | 20.0% | 20.0% | 20.0% | 20.0% | 20.0% | 20.0% | 20.0% | 20.0% |
| | 6EO-modified trimethylol-propane triacrylate | 37.6% | 38.3% | 38.6% | 38.8% | 38.8% | 38.1% | 38.6% | 38.8% | 38.6% | 38.8% | 39.0% | 39.0% |
| Polymerization inhibitor | Irgastab UV10 | 0.1% | 0.1% | 0.1% | 0.1% | 0.1% | 0.1% | 0.1% | 0.1% | 0.1% | 0.1% | 0.1% | 0.1% |
| Photo-polymerization initiator | TPO | 6.0% | 6.0% | 6.0% | 6.0% | 6.0% | 6.0% | 6.0% | 6.0% | 6.0% | 6.0% | 6.0% | 6.0% |
| | Irgacure 819 | 3.0% | 3.0% | 3.0% | 3.0% | 3.0% | 3.0% | 3.0% | 3.0% | 3.0% | 3.0% | 3.0% | 3.0% |
| Surfactant | KF-352 | 0.1% | 0.1% | 0.1% | 0.1% | 0.1% | 0.1% | 0.1% | 0.1% | 0.1% | 0.1% | 0.1% | 0.1% |
| Pigment dispersion | | 15.0% | 15.0% | 15.0% | 15.0% | 15.0% | 15.0% | 15.0% | 15.0% | 15.0% | 15.0% | 15.0% | 15.0% |
| Total amount | | 100% | 100% | 100% | 100% | 100% | 100% | 100% | 100% | 100% | 100% | 100% | 100% |
| Gelation temperature of ink (° C.) | | 66 | 55 | 55 | 55 | 57 | 57 | 55 | 55 | 40 | 38 | 36 | 35 |

TABLE 1C

| Component | Compound name/product name | Ink set 7 | | | | Ink set 8 | | | | | |
|---|---|---|---|---|---|---|---|---|---|---|---|
| | | Y7 | M7 | C7 | K7 | Y8 | M8 | C8 | K8 | V8 | O8 |
| Gelling agent | Kao Wax T1 | | | | 2.2% | 2.0% | | | | | |
| | UNISTAR M-2222SL | 2.0% | 2.1% | 2.3% | 1.0% | 2.2% | 2.1% | 2.1% | 2.0% | 2.1% | 2.0% |
| | WE11 | | | | | | | | | | |

TABLE 1C-continued

| Component | Compound name/ product name | Ink set 7 | | | | Ink set 8 | | | | | |
|---|---|---|---|---|---|---|---|---|---|---|---|
| | | Y7 | M7 | C7 | K7 | Y8 | M8 | C8 | K8 | V8 | O8 |
| Actinic radiation-curable compound | 3PO-modified trimethylolpropane triacrylate | 15.0% | 15.0% | 15.0% | 15.0% | 15.0% | 15.0% | 15.0% | 15.0% | 15.0% | 15.0% |
| | Polyethylene glycol #400 diacrylate | 20.0% | 20.0% | 20.0% | 20.0% | 20.0% | 20.0% | 20.0% | 20.0% | 20.0% | 20.0% |
| | 6EO-modified trimethylolpropane triacrylate | 38.8% | 38.7% | 38.5% | 37.6% | 36.6% | 38.7% | 38.7% | 38.8% | 38.7% | 38.8% |
| Polymerization inhibitor | Irgastab UV10 | 0.1% | 0.1% | 0.1% | 0.1% | 0.1% | 0.1% | 0.1% | 0.1% | 0.1% | 0.1% |
| Photopolymerization initiator | TPO | 6.0% | 6.0% | 6.0% | 6.0% | 6.0% | 6.0% | 6.0% | 6.0% | 6.0% | 6.0% |
| | Irgacure 819 | 3.0% | 3.0% | 3.0% | 3.0% | 3.0% | 3.0% | 3.0% | 3.0% | 3.0% | 3.0% |
| Surfactant | KF-352 | 0.1% | 0.1% | 0.1% | 0.1% | 0.1% | 0.1% | 0.1% | 0.1% | 0.1% | 0.1% |
| Pigment dispersion | | 15.0% | 15.0% | 15.0% | 15.0% | 15.0% | 15.0% | 15.0% | 15.0% | 15.0% | 15.0% |
| Total amount | | 100% | 100% | 100% | 100% | 100% | 100% | 100% | 100% | 100% | 100% |
| Gelation temperature of ink (° C.) | | 55 | 58 | 61 | 64 | 58 | 58 | 58 | 55 | 55 | 55 |

TABLE 1D

| Component | Compound name/ product name | Ink set 9 | | Ink set 10 | |
|---|---|---|---|---|---|
| | | W9 | K9 | W10 | K10 |
| Gelling agent | Kao Wax T1 | 0.5% | | | |
| | UNISTAR M-2222SL | | | | |
| | WE11 | 2.0% | 2.0% | 1.0% | 2.0% |
| Actinic radiation-curable compound | 3PO-modified trimethylolpropane triacrylate | 15.0% | 15.0% | 15.0% | 15.0% |
| | Polyethylene glycol #400 diacrylate | 20.0% | 20.0% | 20.0% | 20.0% |
| | 6EO-modified trimethylolpropane triacrylate | 38.3% | 38.8% | 39.8% | 38.8% |
| Polymerization inhibitor | Irgastab UV10 | 0.1% | 0.1% | 0.1% | 0.1% |
| Photopolymerization initiator | TPO | 6.0% | 6.0% | 6.0% | 6.0% |
| | Irgacure 819 | 3.0% | 3.0% | 3.0% | 3.0% |
| Surfactant | KF-352 | 0.1% | 0.1% | 0.1% | 0.1% |
| Pigment dispersion | | 15.0% | 15.0% | 15.0% | 15.0% |
| Total amount | | 100% | 100% | 100% | 100% |
| Gelation temperature of ink (° C.) | | 43 | 40 | 40 | 40 |

It is to be noted that the details on the components used for preparing the inks are as described in Table 2.

TABLE 2

| Compound type | Product name | Manufacturer |
|---|---|---|
| Gelling agent | Distearyl ketone | Kao Wax T1 | Kao |
| | Behenyl behenate | UNISTAR M-2222SL | NOF |
| | — | WE11 | NOF |
| Polymerization inhibitor | — | Irgastab UV10 | BASF |
| Photo-polymerization initiator | — | TPO | BASF |
| Photo-polymerization initiator | — | Irgacure 819 | BASF |
| Surfactant | — | KF-352 | Shin-Etsu Chemical |

<Measurement of Gelation Temperature>

The gelation temperatures (Tgel) (° C.) of the prepared inks were measured by the following method.

Temperature changes in dynamic viscoelasticity of the inks were first measured using a rheometer. Specifically, the inks were heated to 100° C. and then cooled to 20° C. with conditions including a shear rate of 11.7/s and a temperature decrease rate of 0.1° C./s to obtain temperature change curves of viscosities. The gelation temperatures were each obtained as a temperature where the viscosity was 200 mPa·s in the temperature change curves of the viscosities.

As for the rheometer, stress control type rheometer Physica MCR series manufactured by Anton Paar GmbH was used. The diameter of the cone plate was 75 mm and the corn angle was 1.0°.

<Inkjet Image Forming Method>

Each of the prepared ink compositions was loaded on an inkjet recording apparatus of single pass printing type, the inkjet recording apparatus including inkjet recording heads each provided with piezo type inkjet nozzles. An ink supplying system included an ink tank, an ink channel, a sub ink tank immediately before the inkjet recording head, filter-attached piping, and a piezo head, and the area from the ink tank to the head was warmed to 100° C.

A voltage was applied to the piezo heads such that 6-pl droplets were discharged, and the inks were discharged using four 360 dpi resolution heads to form a 1,440×1,440 dpi portrait image (Graphic technology-Prepress digital data exchange-CMYK standard colour image data, JIS X 9201: 1995, N1) on the recording media described in Table 3.

It is to be noted that when the formation of the image was performed, the temperatures of the recording media were each set at the temperature as described in Table 4.

TABLE 3

| Product name | Recording Medium | Manufacturer | Thermal conductivity W/(m · K) | Thickness mm | Basis weight g/m² |
|---|---|---|---|---|---|
| G flute | Thin corrugated cardboard | Nippon Tokan Package Co., Ltd. | 0.06 | 0.90 | *1 |
| Maricoat | Coated white lined board | Hokuetsu Kishu Paper Co., Ltd. | 0.06 | 0.60 | 270 |
| NOABELLE | PS sheet | RP TOPLA LIMITED | 0.09 | 0.40 | *2 |

*1 Thin corrugated cardboard has a three-layered structure, and the basis weight in a liner portion of the uppermost layer and in a corrugated medium portion of the intermediate layer are different, and therefore the basis weight is not described.
*2 The basis weight does not exist because the base material is plastic.

After the image was formed, the inks were irradiated and cured with light from an LED lamp (395 nm, 8 W/cm², water cooled unit) manufactured by Phoseon Technology. It is to be noted that the distance from the lamp to the surface of the recording media was 20 mm, the conveyance speed of the recording media was 40 m/s, and the light quantity was 300 mJ/cm². It is to be noted that the light quantity was measured using a UV power meter (C9536, H9958 manufactured by Hamamatsu Photonics K. K.).

It is to be noted that with respect to ink sets 9 and 10 each consisting of two color inks of white (W) and black (K), only the PS sheet (NOABELLE) was used as a recording medium, a 100% solid image was formed on the recording medium using the K ink, and a 100% solid image was then formed using the W ink so as to superpose the W ink on the K ink. Curing of the inks was performed by exposing the inks under the above-described conditions within 5 seconds from the formation of the image.

<Image Evaluation Method>
(Curability)

Coated paper was placed on the image face immediately after the image sample was output, and the image surface was rubbed 30 times with a load of 500 g applied thereon. The image surface after that was visually evaluated based on the criteria described below.

A: Lowering of image density after rubbing is not visually recognized

B: Slight lowering of image density after rubbing is visually recognized but is at a level causing no problem in practical use C: Remarkable lowering of image density after rubbing is visually recognized (Difference in Glossiness)

Uncomfortable feeling of glossiness in light and shade portions was visually evaluated based on the criteria described below for the output image samples.

A: Uncomfortable feeling of glossiness is not visually recognized

B: Slight uncomfortable feeling of glossiness is visually recognized but is at a level causing no problem in practical use C: Remarkable uncomfortable feeling of glossiness is visually recognized (Color Unevenness)

Color unevenness in high-density portions was visually evaluated based on the criteria described below for the output image samples.

A: Color unevenness is not visually recognized

B: Slight color unevenness is visually recognized but is at a level causing no problem in practical use C: Remarkable color unevenness is visually recognized (Blank)

A white streak and a blank were visually evaluated based on the criteria described below for the output image samples.

A: Neither a white streak nor a blank exist

B: One or two white streaks or blanks exist but are at a level causing no problem in practical use C: A lot of white streaks and blanks occur Evaluation results for the images formed using respective ink sets are described in Table 4.

It is to be noted that an ink set whose evaluation result is B or C for all the evaluations can be put into practical use.

TABLE 4

| | | G flute | | | | Maricoat | | | | NOABELLE | | | | |
|---|---|---|---|---|---|---|---|---|---|---|---|---|---|---|
| | Temperature of recording medium | Curability | Difference in glossiness | Color unevenness | Blank | Curability | Difference in glossiness | Color unevenness | Blank | Curability | Difference in glossiness | Color unevenness | Blank | Notes |
| Ink set 1 | 45° C. | C | C | C | C | C | C | C | C | C | C | C | C | Comparative Example |
| Ink set 2 | 45° C. | B | B | B | A | A | A | A | A | B | B | A | A | Present invention |
| Ink set 3 | 45° C. | A | A | A | A | A | A | A | A | A | A | A | A | Present invention |
| Ink set 4 | 45° C. | A | A | A | B | A | A | A | A | A | A | A | A | Present |

TABLE 4-continued

| | Temperature of recording medium | G flute | | | | Maricoat | | | | NOABELLE | | | | Notes |
|---|---|---|---|---|---|---|---|---|---|---|---|---|---|---|
| | | Curability | Difference in glossiness | Color unevenness | Blank | Curability | Difference in glossiness | Color unevenness | Blank | Curability | Difference in glossiness | Color unevenness | Blank | |
| Ink set 4 | 45° C. | C | C | C | C | B | C | B | B | B | C | B | C | invention Comparative Example |
| Ink set 5 | 35° C. | A | A | A | A | A | A | A | A | A | A | A | A | Present invention |
| Ink set 6 | 45° C. | C | C | C | C | C | C | C | C | C | C | C | C | Comparative Example |
| Ink set 7 | 45° C. | A | A | A | A | A | A | A | A | A | A | A | A | Present invention |
| Ink set 8 | 35° C. | — | — | — | — | — | — | — | — | A | A | A | A | Present invention |
| Ink set 9 | 35° C. | — | — | — | — | — | — | — | — | C | C | C | C | Comparative Example |

As is clear from the results in Table 4, when ink set 2 to 4, 6, 8 or 9, which is the ink set according to the present invention, was used, the curability of the inks was good, and the difference in glossiness, the color unevenness, or the blank was hardly seen in the images even in the case where printing was performed on recording media which are likely to store heat, the recording media having a thermal conductivity of less than 0.10 W/(m·K), such as thin corrugated cardboard (G flute), thick paper having a thickness of 0.4 mm or more (Maricoat), and a plastic sheet (NOABELLE).

Such high-quality images were also obtained with a low-temperature gel-based ink set such as ink set 6 in which the gelation temperatures were set to be somewhat lower (40° C. to 48° C.). It is preferable to use the low-temperature gel-based ink set from the viewpoint of power consumption because the temperature of a recording medium during printing is also controlled to be low.

Moreover, high-quality images, which are similar to those obtained using the ink sets of 4 colors, were obtained even when the number of color inks was 4 or more, such as ink set 8. It is considered that this is because the total amount of inks adhered to a recording medium does not change so much even though the number of colors increases, and therefore the amount of heat brought in the recording medium is about the same level for 4 colors and 6 colors.

On the other hand, in the case of the ink set in which the gelation temperature does not change at all, such as ink set 1, or the ink set in which the gelation temperature of the ink to be recorded finally is lower than the gelation temperature of the ink to be recorded first, such as ink set 7, both the curability of the inks and the image quality were lowered due to the influence of the temperature rise of the recording media.

Further, in the case of the ink set in which the difference in the gelation temperature between the ink to be printed first and the ink to be printed finally is less than 3° C., such as ink set 5, the curability of inks and the color unevenness in the image were at a level causing no problem in practical use in some recording media. However, evaluation of any one of the difference in glossiness, the color unevenness, and a blank in the images was low.

Moreover, as is clear from the comparison of ink set 9 and ink set 10, in the case where there is no difference between the gelation temperatures of the inks, a high-quality image was not able to be formed on a thick recording medium having a high thermal conductivity even when the number of color inks was two.

The present application is entitled to and claims the benefit of Japanese Patent Application No. 2015-143928, filed on Jul. 21, 2015. The contents of the specification and accompanying drawings of the application are incorporated herein by reference in its entirety.

INDUSTRIAL APPLICABILITY

With the inkjet recording method according to the present invention, lowering of curability of inks is suppressed even when printing is performed on a thick recording medium having a low thermal conductivity, such as corrugated cardboard, and therefore a high-quality color image without the difference in glossiness, the color unevenness, or the blank can be formed.

REFERENCE SIGNS LIST

10 Inkjet recording apparatus
12 Recording medium
14 Inkjet recording head
16 Head carriage
18 Light irradiation section
19 Temperature control section
30 Ink channel
31 Ink tank

The invention claimed is:
1. An inkjet recording method of single pass recording type, the recording method comprising:
   using an ink set comprising at least two actinic radiation-curable color inks each comprising a photocurable compound, a gelling agent, and a colorant to jet out droplets of a plurality of color inks, thereby landing the inks onto a recording medium; and
   irradiating the color inks landed onto the recording medium with actinic radiation to cure the inks,
   wherein:
   when the ink set contains two different color inks, the ink set satisfies only condition (a), and when the ink set contains three or more different color inks, the ink set satisfies both conditions (a) and (b), the conditions (a) and (b) being:
   (a) a color ink at a most downstream position has a gelation temperature which is 3.0° C. to 15.0° C. higher than a gelation temperature of a color ink at a most upstream position, and

(b) a second or subsequent color ink as counted from the most upstream position in a conveyance direction has a gelation temperature which is the same as or higher than a gelation temperature of an adjacent color ink at an upstream side; and the recording medium has a thermal conductivity of less than 0.10 W/(m·K) and has a thickness of 0.4 mm or more.

2. The recording method according to claim 1, wherein the recording medium is a paper having a basis weight of 200 g/m² or more, or is a thin corrugated cardboard comprising a corrugated medium and a liner.

3. The recording method according to claim 1, wherein in condition (a), the gelation temperature of the second or subsequent color ink is higher than the gelation temperature of the adjacent color ink at the upstream position.

4. The recording method according to claim 1, wherein the ink set comprises 4 color inks of yellow (Y), magenta (M), cyan (C), and black (K), and further comprises a different color ink.

5. The recording method according to claim 1, wherein the color ink at the most downstream position is a color ink having a highest brightness in the ink set.

6. The recording method according to claim 1, wherein each color ink contained in the ink set has a gelation temperature in a range of from 30° C. to 60° C.

7. The recording method according to claim 1, wherein the gelling agent comprises at least one compound selected from the group consisting of a compound represented by the following formula (G1) and a compound represented by the following formula (G2):

$$R1-CO-R2; \text{ and} \qquad \text{Formula (G1):}$$

$$R3-COO-R4, \qquad \text{Formula (G2):}$$

wherein R1 to R4 each independently represents a hydrocarbon group comprising a straight-chain moiety having 12 or more carbon atoms and optionally comprising an additional branched moiety.

* * * * *